June 6, 1933.  C. W. LAMBERT  1,913,123

AUTOMATIC VARIABLE PITCH PROPELLER

Filed June 27, 1932

Inventor:
C. W. Lambert

Patented June 6, 1933

1,913,123

UNITED STATES PATENT OFFICE

CHANDLEY WILLIAM LAMBERT, OF CLEVELAND, OHIO

AUTOMATIC VARIABLE PITCH PROPELLER

Application filed June 27, 1932. Serial No. 619,481.

The invention relates to improvements in automatic variable pitch propellers, using engine power to change the pitch, controlled by balance springs and a fluid pressure plate.

The invention relates to former application Serial Number 462,877, filed June 21, 1930, now Patent 1,874,053 dated Aug. 30, 1932.

Figure 1:
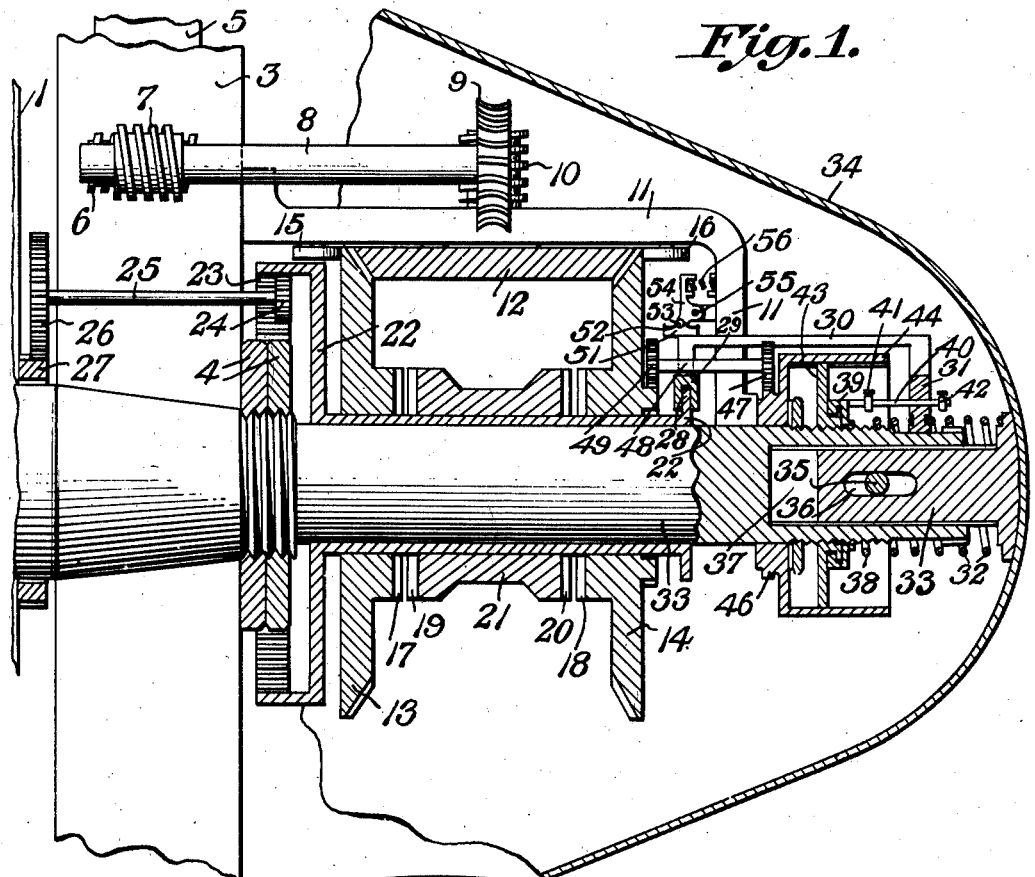
Fig. 1 is a vertical cross-sectional view lengthwise of the drive shaft.
Figure 2:
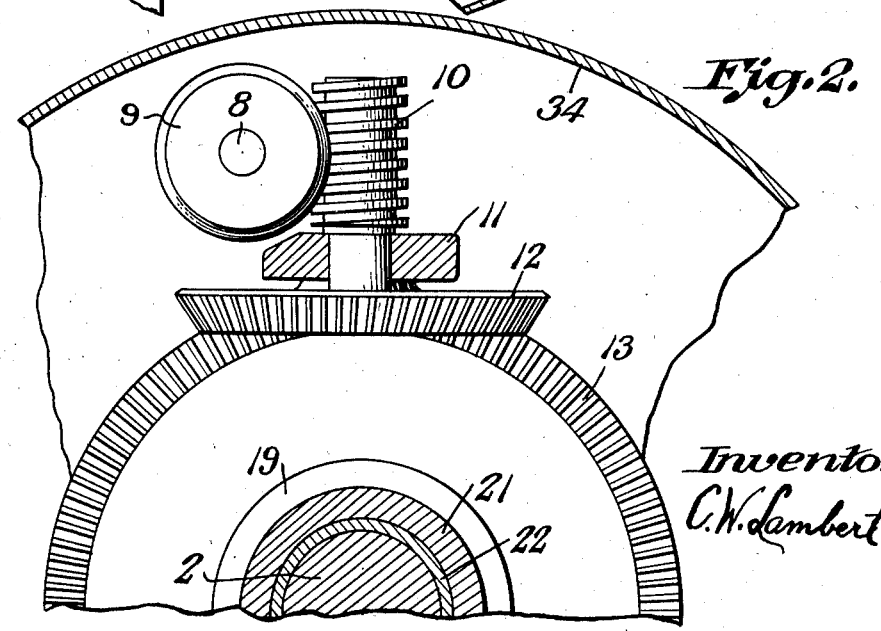
Fig. 2 is an end view of a portion of the actuating mechanism.

The drawing is a longitudinal cross section of one form of the invention, and since the device should be balanced, only one of the similar halves is shown.

In the drawing, 1 represents the crankcase or fuselage, or part of a conveyance from which the propeller shaft 2 projects. 3 is a propeller hub secured to shaft 2, as shown by lock nuts 4—4. The shank of a propeller blade is shown at 5, to which is secured a worm gear at 6. At 7 is represented a worm gear cooperating with gear 6. Worm gear 7 and gear 9 are secured to shaft 8. Worm gear 10, cooperating with 9, is secured to the same shaft as bevel gear 12 on the opposite side of frame or housing 11 which is secured to hub 3 and shaft 2.

It is worthy of note that forces acting on the propeller blade can not turn the worm gears 7 and 10, and the device is nonreversible in the same sense that an automobile steering gear is nonreversible.

Bevel gears 13 and 14 are held in constant mesh with gear 12 by idler pulleys 15 and 16.

17 and 18 are clutch parts secured to gears 13 and 14 respectively, and may engage the other clutch parts 19 or 20 secured to collar 21 which is secured to sleeve 22 which is revolved by gear 23 cooperating with gear 24 on shaft 25, which has a suitable bearing in or on hub 3, and to which gear 26 is attached. Gear 26 cooperates with gear 27 which is secured to chassis 1.

Gear 27 is shown as an external ring gear and gear 23 as an internal ring gear. Any other combination of gears may be used just so that sleeve 22 revolves at a different speed than shaft 2.

At 28 is shown a shoulder or thrust bearing, secured to sleeve 22, and a loose collar 29 to which is secured rod 30, which at the other end is secured to control plate 31. Parts 29—30—31 revolve at the same speed as shaft 2 but are limitedly slidable longitudinally.

32 is a compression spring cooperating with control plate 31 and pressure plate 34 which is secured to a slidable sleeve or extension 33 of shaft 2.

Pin 35 and closed slot 36 limit the movement of extension 33 in recess 37 of shaft 2.

Compression spring 38 between control plate 31 and loose collar 39, balances the pressure of spring 32. Attached to loose collar 39 is rod 40 having adjustable stops 41 and 42 for limiting the extent of the action of the gear 12 as later explained.

Loose collar 39 cooperates with nut 43 which travels on a thread on shaft 2 and is turned by the feathered tube 44.

Tube 44 is secured to collar 45, loose on shaft 2 but having a gear 46 which cooperates with gear 47, shaft 48, gear 49, and gear 50, which is secured to bevel gear 14.

Nut 43 revolves faster or slower than shaft 2 according as to whether one or the other of clutches 17—19 or 20—18 is engaged. When neither clutch is engaged and the control plate 31 is in the central or neutral position, as shown in the drawing, nut 43 rotates at the same rate as shaft 2.

Secured to control rod 30 is a rack 51 having three notches 52—52—52, corresponding to the three positions of control plate 31 and sleeve 22.

Cooperating with notches 52—52—52, is wheel 53 carried by arm 54 pivoted at 55, to frame 11, and cooperating with compression spring 56. This device is to secure quick and positive clutch action responsive to movement of control plate 31.

We will suppose the airplane to increase its speed as it comes into level flight at the top of its climb.

The air pressure on pressure plate 34 compresses spring 32 and moves control plate 31 to the left. Clutch 17—19 is now engaged and the engine power acting through shaft 2 and frame 11, carries gear 12 around and the reaction of gear 13 causes 12 to revolve on its axis, and through the train of gears turns shank 5 and brings the pitch of the blade up to an angle proper for the speed at the moment pertaining. At the same time nut 43 moves to the right and compresses spring 38 until pressure on spring 38 balances air pressure on conical pressure plate 34 and spring 32. This balancing of the springs acting against control plate 31, returns 31 to neutral position and disengages the clutch.

A decrease of speed, such as a steep climb, causes the air pressure on pressure plate 34 to decrease and release some of the pressure on spring 32. Spring 38 now being stronger moves control plate 31 to the right engaging clutch 20—18, gear 12 revolves in the opposite direction and lowers the angular pitch of the propeller blade. At the same time nut 43 moves toward the left decreasing the pressure on spring 38 and restoring the balance, whereupon the control plate returns to the neutral position, disengaging the clutch.

Should the speed be still further decreased, approaching a stall, or "hanging on the propeller", the pitch is still further reduced, until stop 42 contacts plate 31 and returns it to neutral position. This happens at a predetermined pitch which gives the maximum thrust for steep climb or take off.

In the other direction stop 41 contacts plate 31 when the maximum predetermined pitch for the particular engine, or blade installation is reached.

Many other arrangements of the elements of the combination as described are possible, some of which require a smaller number of parts, but all of which require the essential elements which constitute the invention.

I claim:—

1. An automatic variable pitch propeller, comprising; a shaft, a hub secured to said shaft, a propeller blade shank rotatably secured to said hub, means for rotating said shank, cooperatively with said shaft, in reverse directions relative to said hub, control means comprising a pressure plate, a control plate, a feathered nut, and balancing springs, said control means cooperating with said reversible shank rotating means.

2. A propeller shaft, a propeller hub secured to said shaft, a propeller blade shank cooperating with said hub, operative means combining controlled power for rotating said shank in reverse directions relatively to said hub, control means combining a control plate, compression springs cooperating with said control plate, a pressure plate cooperating with one of said springs, a movable nut, relatively positioned conformatively with said shank, cooperating with the other said spring; means limiting the extent of application of said power in reverse directions to said shank.

3. A propeller shaft, a hub secured to said shaft, a propeller blade shank coaxially rotative relatively to said hub, a control plate longitudinally slidable on said shaft, balance springs cooperating with said control plate, a fluid pressure plate cooperating with one said spring, a traveling nut cooperating with the other said spring, means using engine power for rotating said shank in reverse directions, means cooperatively associating said control plate with said rotating means for controlling the application of power in reverse directions to said shank, means limiting the extent of application of said controlled power to said shank.

4. A propeller shaft, a radially positioned propeller hub secured to said shaft, a propeller blade shank rotatively associated with said hub, means combining engine power controllably transmitted for rotating said shank relatively to said hub, means for controllably reversing the power transmission means for rotating said shank in reverse directions relatively to said hub, control means comprising opposing balance springs cooperating with said reversing means, a fluid pressure plate cooperating with one of said balance springs, means cooperatively associated with said shank rotating means for compressing the other said balance spring relatively to the angular displacement of said propeller shank, means limiting the application of controlled power in reverse directions to said propeller shank.

5. A propeller shaft, a hub secured to said shaft, a rotatable propeller blade shank cooperating with said hub, rotative means for said shank comprising gearing reacting against a non-rotative part, reversing means comprising controlled clutches cooperating with said shank rotative means and a control mechanism, said control comprising balancing springs cooperating with a fluid pressure plate and a splined nut positionably controlled by said rotative means, said balancing springs cooperating with a control plate, shank rotation limiting means comprising a sliding rod cooperating with said splined nut and stops on said rod cooperating with said control plate.

CHANDLEY WILLIAM LAMBERT.